July 3, 1923.
R. W. DULL
PROCESS FOR SECURING WRIST PINS FOR CHAIN LINKS
Filed March 23, 1921
1,460,749
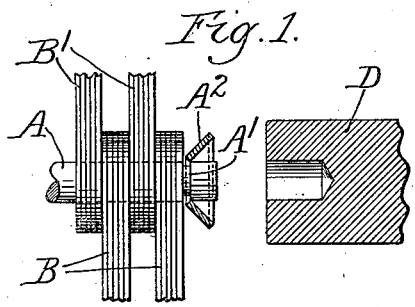
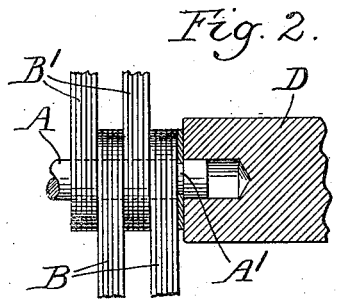
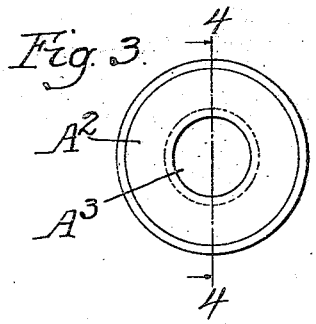
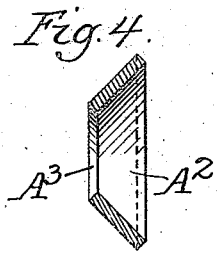
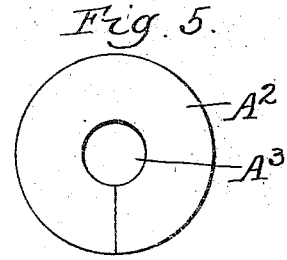
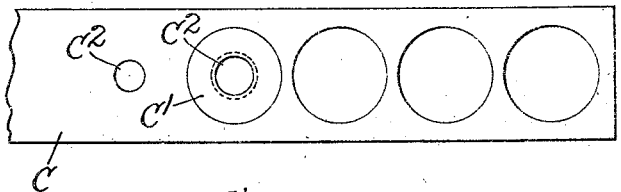
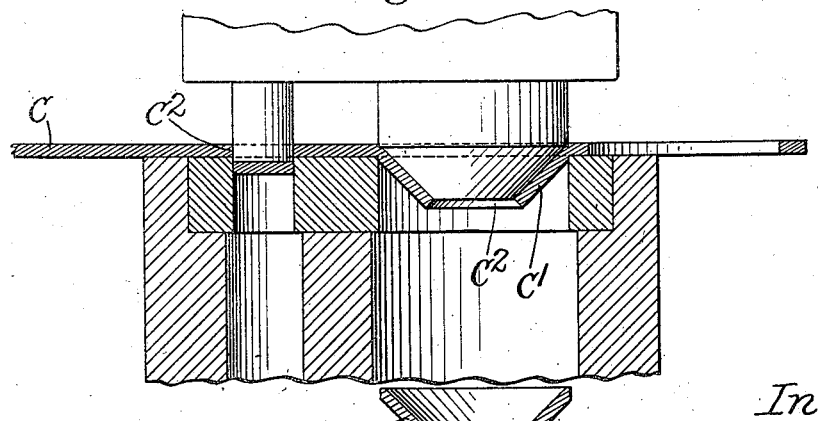
Witness.
Edward T. Wray,
Inventor.
Raymond W. Dull.
by Parks & Carter
Attorneys.

Patented July 3, 1923.

1,460,749

UNITED STATES PATENT OFFICE.

RAYMOND W. DULL, OF CHICAGO, ILLINOIS, ASSIGNOR TO LINK BELT COMPANY, OF CHICAGO, ILLINOIS, A CORPORATION OF ILLINOIS.

PROCESS FOR SECURING WRIST PINS FOR CHAIN LINKS.

Application filed March 23, 1921. Serial No. 454,974.

*To all whom it may concern:*

Be it known that I, RAYMOND W. DULL, a citizen of the United States, residing at Chicago, in the county of Cook and State of Illinois, have invented a certain new and useful Improvement in Processes for Securing Wrist Pins for Chain Links, of which the following is a specification.

My invention relates to improvements in wrist pins for chain links having reference particularly to use in connection with the so-called silent chain, though of course, the wrist pin and the method of holding the pin in place might be used in a large number of situations wherever it is desirable to hold a pin against longitudinal displacement.

One object of my invention then, is to provide a wrist pin which can be readily applied or removed. Another object is to provide in connection with a wrist pin, a substitute for the usual upset or riveted end. Another object is to provide in a wrist pin, easy and convenient means for fastening it in place. Other objects will appear from time to time in the specification.

My invention is illustrated more or less diagrammatically in the accompanying drawings wherein:

Figure 1 is a plan view of a portion of a chain showing the holding washer in position for upsetting;

Figure 2 is a similar view showing the holding washer after upsetting;

Figure 3 is a detail elevation of the holding washer;

Figure 4 is a cross section of the holding washer;

Figure 5 is a detail elevation of a modified form of holding washer;

Figure 6 shows a strip from which the washer may be made;

Figure 7 is a section through one of the washer forming bosses on the strip.

Like parts are indicated by like character in all the drawings.

A is a wrist pin. It has at either end an annular groove A'. The distance between the inner boundaries of the two grooves being substantially equal to the width of the chain or other member or members held by or holding the pin. $A^2$ is a washer having an annular central opening $A^3$ of such size that when the washer is cupped as indicated in Figures 1 and 4, the annular opening is just big enough to slip over the end of the pin, but when the washer is flattened out into a plane, the annular opening is too small to pass over the pin and therefore as it penetrates the annular groove in the pin, it holds the washer in position on the pin.

For purposes of illustration, I have shown the separate flat link elements B B' of a silent chain extending in opposite directions from the pin and held in working direction by the pin, although of course, an ordinary sprocket link or any other link or member might equally well be held by the pin.

C is a flat washer forming strip. One way of forming the washer:—a series of holes $C^2$ are punched in the strip, then the strip is punched out to form bosses surrounding the holes and then the finished conical washer $C^3$ may be punched out of the bossed portion of the strip. Another way of forming these washers would be to form them in the usual manner, then place them in a forming die which would stretch them, enlarging the central hole and giving the washer a conical contour or shape.

In the modified form, the washer is shown instead of being conically distorted, slit along one radial line. In this case, the hole is normally smaller than the pin, but when the washer is slipped onto the pin, it expands the opposed edges of the split separately.

D is a tool adapted to straddle or surround the end of the pin and engage the washer to flatten it out and thus force the washer into position in the groove in the pin.

It will be evident that while I have shown in my drawings, an operative device, still many changes might be made in size, shape, and arrangement of parts without departing materially from the spirit of my invention and I wish therefore that my drawings be regarded as in a sense, diagrammatic.

The use and operation of my invention are as follows:

In either of the two modified forms, it is the distortion or splitting or collapsing of the washer itself, which causes it to grip the pin and penetrate within the annular groove within the pin and hold it in position on the pin. The preferred form is of course the first one shown because it is a more operative and satisfactory arrangement, but the distortion of the washer to permit holding of the pin is present in both cases.

In the preferred form, the pin is formed from a rod in the usual way by turning the annular grooves and cutting off the wrist pin lengths to suit. These pins are then assembled in a chain or other such device. The washer may be made and then upset conically or the washer may be formed from a strip of material as above suggested having conical bosses thereon. In either case, the central opening of the washer when the washer is cone shaped must be large enough to fit freely over the pin. The washer is by the operator, then slipped over the pin with the apex end in, until the central portion is in the plane of the annular groove. Then by means of a tool or other arrangement, the washer is bumped flat until its entire body is in a plane perpendicular to the pin. When this is done, the material around the outside of the washer will be under tension, and the material on the inside under compression and the compressive force on the material on the outer portion of the washer will be sufficient to reduce the size of the opening in the washer enough to make it smaller than the outside diameter of the pin and thus cause the washer to penetrate the annular groove and grip the pin at its reduced diameter.

To disengage the washer, it is only necessary to press the rim outwardly sufficiently to restore it to its cup shape, thus releasing the central compressed portion of the material and enlarging the diameter of the aperture.

I claim:

1. The process of securing chain links together, which consists in threading through such links a circumferentially channeled pin and placing a cupped washer thereabout with the central aperture of said washer in line with the channel, and in exerting force against the periphery of such washer to align it in the plane of such channel.

2. The process of securing chain links together, which consists in threading through such links a circumferentially channeled pin and placing a cupped washer adjacent the links to be secured, the inner aperture of said washer lying adjacent said links, and in forcing the periphery of said washer in the direction of the links until the body of the washer lies in a plane at right angles to the pin and intersecting it at the securing point.

Signed at Chicago, county of Cook, and State of Illinois, this sixteenth day of March, 1921.

RAYMOND W. DULL.